United States Patent
Armstrong et al.

(10) Patent No.: US 10,654,578 B2
(45) Date of Patent: May 19, 2020

(54) COMBINED AC AND DC TURBOELECTRIC DISTRIBUTED PROPULSION SYSTEM

(71) Applicant: Rolls-Royce North American Technologies, Inc., Indianapolis, IN (US)

(72) Inventors: Michael James Armstrong, Avon, IN (US); Mark Jon Blackwelder, Plainfield, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 580 days.

(21) Appl. No.: 15/341,554

(22) Filed: Nov. 2, 2016

(65) Prior Publication Data
US 2018/0118356 A1    May 3, 2018

(51) Int. Cl.
*B64D 27/24* (2006.01)
*H02P 5/74* (2006.01)
(Continued)

(52) U.S. Cl.
CPC ............ *B64D 27/24* (2013.01); *B63H 21/17* (2013.01); *B63H 23/24* (2013.01); *B64C 11/30* (2013.01);
(Continued)

(58) Field of Classification Search
CPC .. B64D 27/24; B64D 2027/026; B63H 23/24; B63H 21/17; H02J 1/00; H02J 4/00;
(Continued)

(56) References Cited

U.S. PATENT DOCUMENTS

| 4,114,555 A | * | 9/1978 | O'Brien, Jr. | ........... B63H 23/24 114/121 |
| 4,661,714 A | * | 4/1987 | Satterthwaite | ......... B63H 23/24 290/4 R |

(Continued)

FOREIGN PATENT DOCUMENTS

| EP | 2192681 A1 | 6/2010 |
| EP | 3222510 A1 | 9/2017 |
| WO | 2014158240 A2 | 10/2014 |

OTHER PUBLICATIONS

Felder et al., "Turboelectric Distributed Propulsion in a Hybrid Wing Body Aircraft," American Institute of Aeronautics and Astronautics, Inc., 2011, 20 pp. (Applicant points out, in accordance with MPEP 609.04(a), that the year of publication, 2011, is sufficiently earlier than the effective U.S. filing date, Nov. 2016, so that the particular month of publication is not in issue.).

(Continued)

*Primary Examiner* — Hal Kaplan
*Assistant Examiner* — Terrence R Willoughby
(74) *Attorney, Agent, or Firm* — Shumaker & Sieffert, P.A.

(57) ABSTRACT

A propulsion system is described that includes an AC generator configured to produce AC current, and a plurality of propulsors configured to receive the AC current from the AC generator and provide thrust based on the AC current from the AC generator. The propulsion system further includes an AC distribution system configured to deliver a first portion of the AC current to a first group of propulsors from the plurality of propulsors, and a second subsystem configured to deliver a second portion of the AC current to a second group of propulsors from the plurality of propulsors.

19 Claims, 6 Drawing Sheets

(51) Int. Cl.
| | |
|---|---|
| *B63H 23/24* | (2006.01) |
| *B63H 21/17* | (2006.01) |
| *H02J 4/00* | (2006.01) |
| *B64C 11/30* | (2006.01) |
| *H02J 1/00* | (2006.01) |
| *H02J 3/14* | (2006.01) |
| *H02P 29/00* | (2016.01) |
| *B64D 27/02* | (2006.01) |

(52) U.S. Cl.
CPC .................. *H02J 1/00* (2013.01); *H02J 3/14* (2013.01); *H02J 4/00* (2013.01); *H02P 5/74* (2013.01); *H02P 29/00* (2013.01); *B60L 2200/10* (2013.01); *B60L 2200/32* (2013.01); *B64D 2027/026* (2013.01); *Y02T 10/642* (2013.01); *Y02T 50/62* (2013.01)

(58) Field of Classification Search
CPC .... H02J 3/14; H02P 5/74; H02P 29/00; B64C 11/30; Y02T 50/62; Y02T 10/642; B60L 2200/10; B60L 2200/32
See application file for complete search history.

(56) References Cited

U.S. PATENT DOCUMENTS

| | | | |
|---|---|---|---|
| 4,927,329 A * | 5/1990 | Kliman | F01D 7/00 416/127 |
| 8,425,267 B2 * | 4/2013 | Harpin | B63H 21/17 440/6 |
| 10,008,856 B2 * | 6/2018 | Pan | H02J 11/00 |
| 10,450,080 B1 * | 10/2019 | Beach | B64D 27/24 |
| 2003/0107352 A1 | 6/2003 | Downer et al. | |
| 2005/0012339 A1 | 1/2005 | Mikhail et al. | |
| 2007/0077830 A1 * | 4/2007 | Rzadki | B63G 13/02 440/6 |
| 2008/0028452 A1 | 1/2008 | Lee et al. | |
| 2008/0308685 A1 * | 12/2008 | Decker | B64C 11/305 244/53 R |
| 2009/0015063 A1 | 1/2009 | Michalko | |
| 2010/0094490 A1 | 4/2010 | Alston et al. | |
| 2012/0256422 A1 | 10/2012 | Fradella | |
| 2013/0033206 A1 | 2/2013 | Gallegos-Lopez et al. | |
| 2013/0200691 A1 | 8/2013 | Crane et al. | |
| 2013/0270902 A1 * | 10/2013 | Andersen | H02H 7/26 307/9.1 |
| 2014/0032002 A1 | 1/2014 | Iwashima et al. | |
| 2014/0145448 A1 | 5/2014 | Lewis | |
| 2014/0161646 A1 | 6/2014 | Taillardat | |
| 2014/0197681 A1 | 7/2014 | Iwashima et al. | |
| 2014/0333126 A1 | 11/2014 | Vyas | |
| 2015/0035286 A1 | 2/2015 | Stephens | |
| 2015/0045976 A1 * | 2/2015 | Li | H02J 4/00 700/295 |
| 2015/0103457 A1 | 4/2015 | Shander et al. | |
| 2016/0052505 A1 | 2/2016 | Zhou | |
| 2016/0200436 A1 * | 7/2016 | North | B64C 29/0033 244/7 R |
| 2016/0236790 A1 | 8/2016 | Knapp et al. | |
| 2016/0244158 A1 * | 8/2016 | Fredericks | B64C 25/52 |
| 2016/0355272 A1 | 12/2016 | Moxon | |
| 2016/0359324 A1 | 12/2016 | Knowles et al. | |
| 2016/0365810 A1 * | 12/2016 | Armstrong | B63H 21/17 |
| 2017/0126069 A1 | 5/2017 | Martin | |
| 2017/0170764 A1 | 6/2017 | Blackwelder et al. | |
| 2017/0253344 A1 | 9/2017 | Wangemann et al. | |
| 2017/0298721 A1 * | 10/2017 | Shin | E21B 44/00 |
| 2018/0062388 A1 | 3/2018 | Mathiesen et al. | |
| 2018/0102644 A1 | 4/2018 | Perreault et al. | |
| 2018/0112599 A1 | 4/2018 | Dalal | |
| 2018/0138716 A1 | 5/2018 | Bailey et al. | |
| 2018/0187604 A1 | 7/2018 | Poumarede et al. | |
| 2018/0375327 A1 | 12/2018 | Eddins et al. | |

OTHER PUBLICATIONS

Campbell, "Architecting Aircraft Power Distribution Systems Via Redundancy Allocation," Georgia Institute of Technology, Dec. 2014, 352 pp.
Felder, "NASA N3-X with Turboelectric Distributed Propulsion," IMechE Distributive Green Propulsion Technologies Conference, Nov. 16-17, 2014, 18 pp.
Jones et al., "Protection System Considerations for DC Distributed Electrical Propulsion System," SAE Aerotech Congress and Exhibition, 2015, 10 pp. (Applicant points out, in accordance with MPEP 609.04(a), that the year of publication, 2011, is sufficiently earlier than the effective U.S. filing date, Nov. 2016, so that the particular month of publication is not in issue.).
Armstrong et al., Architecture, Voltage, and Components for a Turboelectric Distributed Propulsion Electric Grid, NASA/CR-2015-218440, Jul. 2015, 271 pp.
Office Action from U.S. Appl. No. 15/784,582, dated Feb. 15, 2019, 25 pp.
Search Report from counterpart European Application No. 17194502.5, dated Mar. 9, 2018, 7 pp.
Armstrong et al., "Propulsion System Component Considerations for NASA N3-X Turboelectric Distributed Propulsion System", SAE Int. J. Aerpsp., vol. 5, No. 2, Dec. 2012, 10 pp.
Armstrong et al., Advanced Hybrid-Electric Architectures "Implications of distribution voltage configuration on TeDP electrical systems", Aircraft Engineering and Aerospace Technology: An International Journal, vol. 86, No. 6, 501-508, 2014, 8 pp. (Applicant points out, in accordance with MPEP 609.04(a), that the year of publication, 2014, is sufficiently earlier than the effective U.S. filing date, 2016 so that the particular month of publication is not in issue.).
U.S. Appl. No. 15/784,582, filed Oct. 16, 2017 by Michael James Armstrong et al.
Response to Office Action dated Feb. 15, 2019, from U.S. Appl. No. 15/784,582, filed Jun. 17, 2019, 15 pp.
Intent to Grant dated Aug. 23, 2019, from counterpart European Application No. 17194502.5, 60 pp.
Notice of Allowance from U.S. Appl. No. 15/784,582, dated Sep. 12, 2019, 10 pp.
Response to Extended Search Report dated May 15, 2018, from counterpart European Application No. 17194502.5, filed Nov. 1, 2018, 47 pp.
Notice of Allowance from U.S. Appl. No. 15/784,582, dated Dec. 27, 2019, 9 pp.

* cited by examiner

COMBINED AC AND DC TURBOELECTRIC DISTRIBUTED PROPULSION SYSTEM

TECHNICAL FIELD

The disclosure relates to techniques for controlling turboelectric distributed propulsion (TeDP) systems.

BACKGROUND

Some aircraft use turboelectric distributed propulsion (TeDP) systems for distributing electrical power from onboard generators to one or more propulsors to provide all or a portion of the vehicles overall thrust. A TeDP system is a type of propulsion system, used for conventional takeoff and landing (CTOL) and/or vertical takeoff and landing (VTOL) aircraft, in which propulsors are distributed about the vehicle. Each propulsor may include a motor for driving a propeller or fan that rotates at a designated speed so as to propel a vehicle. In addition, the placement of the distributed propulsors positively affects the vehicle's aerodynamic performance.

SUMMARY

In one example, the disclosure is directed to a propulsion system that includes an AC generator configured to produce AC current and a plurality of propulsors configured to receive the AC current from the AC generator and provide thrust based on the AC current from the AC generator. The propulsion system further includes an AC distribution system configured to deliver a first portion of the AC current to a first group of propulsors from the plurality of propulsors, and a second subsystem configured to deliver a second portion of the AC current to a second group of propulsors from the plurality of propulsors.

In another example, the disclosure is directed to a method that includes modulating, by a controller of a propulsion system, a first amount of thrust provided by a first group of propulsors from a plurality of propulsors of the propulsion system by controlling a rotational speed of an AC generator of the propulsion system, and modulating, by the controller, a second amount of thrust provided by a second group of propulsors from a plurality of propulsors of the propulsion system by controlling the motor speeds of the second group of propulsors.

In yet another example, the disclosure is directed to a system that includes means for delivering a first portion of an AC current to a first group of propulsors from the plurality of propulsors, means for delivering a second portion of the AC current to a second group of propulsors from the plurality of propulsors, and means for modulating a first amount of thrust provided by the first group of propulsors by controlling a rotational speed of an AC generator of the propulsion system. The system further includes means for modulating a second amount of thrust provided by the second group of propulsors by controlling a motor speed of the second group of propulsors.

The details of one or more examples are set forth in the accompanying drawings and the description below. Other features, objects, and advantages of the disclosure will be apparent from the description and drawings, and from the claims.

DETAILED DESCRIPTION

Figure 1:
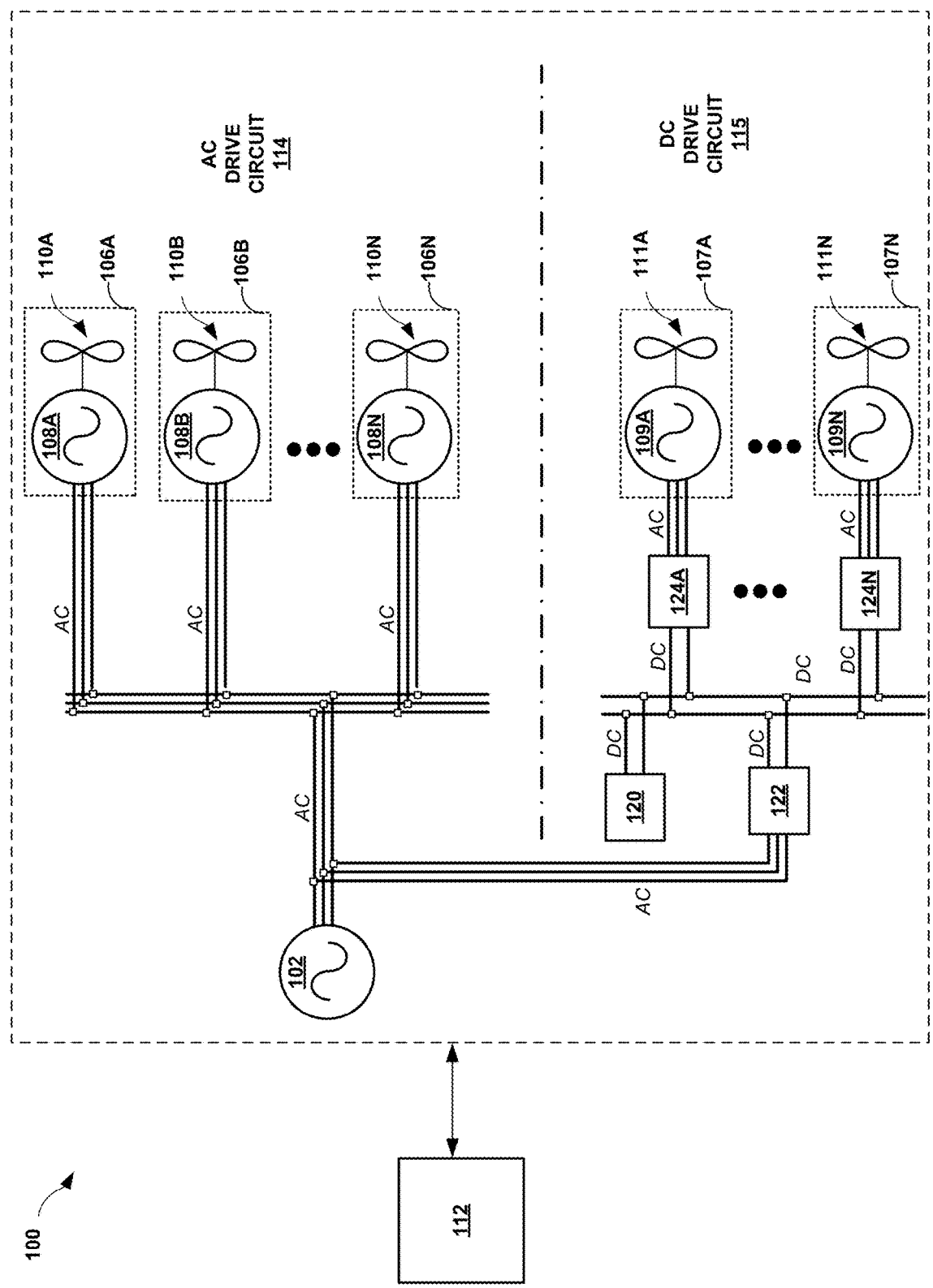
FIG. 1 is a conceptual diagram illustrating an example electric propulsion system that uses both AC power distribution and DC power distribution, in accordance with one or more aspects of the present disclosure.

Some TeDP systems may drive each propulsor motors directly, using variable frequency, AC power that is produced by an AC turbogenerator (e.g., being driven by a turboshaft engine or other device). When driving propulsor motors by a variable frequency AC power, the propulsor motors must maintain speed synchronicity with the generator. As such thrust modulation might only be achieved via engine shaft speed control or variable pitch mechanisms.

Other TeDP systems may drive each propulsor motor indirectly via a DC power distribution system (e.g., DC microgrid) that is powered by an AC turbogenerator being driven by a turboshaft engine. When driving propulsion motors by a DC power distribution system that is powered by an AC turbogenerator, thrust modulation might be achieved via motor speed control in addition to engine shaft speed control or variable pitch mechanisms. However, such propulsion systems may suffer from added weight and losses attributed to added power electronics needed by the DC power distribution system.

In general, techniques and circuits of this disclosure may enable an example electric propulsion system, such as a turboelectric distributed power (TeDP) system on a multi-propeller aircraft, to use AC and DC power distribution systems for thrust power distribution. Rather than relying on either AC or DC power distribution, the example propulsion system uses both an AC and DC power distribution to deliver electrical current to the propulsors of the system. The example propulsion system drives some of the propulsors with electrical current being transmitted through an AC distribution system and drives the remaining propulsors using electrical current being transmitted through a second subsystem of the electric propulsion system. This "second subsystem" may be a DC distribution system or in some examples, may be a variable speed drive that receives variable frequency AC (e.g., via a DC link).

For example, a multipropulsor aircraft may include one or more bulk propulsors powered by an AC portion of an example propulsion system for "bulk" or primary thrust production. The aircraft may perform modulation of the bulk thrust production by controlling the shaft speed of the engine that is driving the AC generator supplying power to the AC portion. In addition, the multirotor aircraft may include one or more flight control propulsors powered by a DC portion of the example propulsion system for flight-control or secondary thrust production. The aircraft may modulate the flight-control thrust production by individually controlling the motor speed of the one or more DC propulsors. In some examples, the multirotor aircraft may use variable pitch control of at least one of the bulk and/or flight control propulsors, or a subset thereof, for additional primary or secondary thrust modulation.

By configuring an example propulsion system to utilize a combination of AC and DC power distribution or a variable speed drives that receive variable frequency AC, the example propulsion system may weigh less and operate with fewer losses to provide bulk thrust production than other propulsion systems that rely only on DC power distribution for thrust production. In addition, the example propulsion system may provide finer control of its flight-control thrust independent of AC generator speed using variable motor speed control. As such, an aircraft that relies on the example propulsion system as described herein may operate more efficiently, cost less, and have a greater operating range than other aircraft that rely on an AC-only or DC-only propulsion system.

FIG. 1 is a conceptual diagram illustrating system 100 as an example electric propulsion system that uses both AC power distribution and DC power distribution, in accordance with one or more aspects of the present disclosure. Although described generally with respect to aircraft, the techniques of this disclosure may also apply to marine craft that rely on turbo electric distributed propulsion systems.

Electric propulsion system 100 is an electrical distribution system that may be found on some aircraft for distributing electrical power to one or more propulsor motors that provide thrust, for example, a combination of bulk and flight-control thrust. Electric propulsion system 100 includes a DC portion referred to as DC drive circuit 115 (also referred to as "DC microgrid 115"). Electric propulsion system 100 also includes an AC portion referred to as AC drive circuit 114 (also referred to herein as "AC microgrid 114"). AC drive circuit 114 may be a variable frequency, three-phase AC portion of system 100 or may be an AC portion of any number of phases.

System 100 includes controller 112 and AC generator 102, and a plurality of propulsors grouped into a first set of propulsors 106A-106N (collectively, "propulsors 106") and a second set of propulsors 107A-107N (collectively, "propulsors 107"). AC generator 102 is a shared power source delivering three-phase AC electrical power to both AC drive circuit 114 and DC drive circuit 115. Although shown as a single generator in FIG. 1 for simplicity and ease of description, AC generator 102 of FIG. 1 may comprise multiple generators, as shown in other drawings. AC drive circuit 114 includes propulsors 106 and DC drive circuit 115 includes propulsors 107. In addition, DC drive circuit 115 includes an energy source 120, an AC-to-DC converter 122 (also referred to as "rectifier 122"), and DC-to-AC converters 124A-124N (collectively "converters 124" and also referred to individually as inverters 124A-124N or collectively as "inverters 124" or "motor drives 124"). In other examples, system 100 may include additional or fewer components than those shown.

AC drive circuit 114 is configured to distribute the AC electrical current provided by AC generator 102 to each of motors 108A-108N (collectively "motors 108") for powering propulsors 106. DC drive circuit 115, and more particularly rectifier 122 is configured to convert the AC electrical current provided by AC generator 102 to DC current, then distribute and convert the DC current (using inverters 124) back to AC electrical current for driving each of motors 109A-109N (collectively "motors 109") of propulsors 107.

AC generator 102 represents any high voltage or high current variable frequency, AC power source for use in an electric propulsion system such as system 100. AC generator 102 is configured to provide electrical power to system 100. For example, AC generator 102 may be a generator driven by a turboshaft engine or other type of machine capable of producing electrical power to drive one or more propulsor motors, such as motors 108 and 109. In some examples, AC generator 102 may have independent sets of windings which are dedicated to each of motors 108 (essentially one machine per motor 108) or which are dedicated to subset of the motors 108. In other examples, AC generator 102 has only a shared set of windings associated with all of motors 108.

Each of propulsors 106 includes one of propulsor motors 108 and one of propulsor fans 110A-110N (collectively "propulsor fans 110"). Propulsors 106 are configured primarily to provide bulk thrust to the aircraft that includes system 100, by simultaneously being driven by the AC electrical power that is distributed by AC drive circuit 114.

Each of propulsors 107 includes one of propulsor motors 109 and one of propulsor fans 111A-111N (collectively "propulsor fans 111"). Propulsors 107 may be primarily configured to provide flight-control thrust to the aircraft that includes system 100, by simultaneously being driven by the DC electrical power that is distributed by DC drive circuit 115.

Propulsors 106 and 107 may be variable pitch propulsors that are able to vary the pitch angle of a respective propulsor fan 110 and 111 that is being driven, during operation, by a respective propulsor motor 108 and 109. Propulsors 106 and 107 may be variable area nozzle propulsors that are able to vary the nozzle area of a respective propulsor fan 110 and 111 that is being driven, during operation, by a respective propulsor motor 108 and 109.

In addition to, or as part of, a respective propulsor motor 108, 109 and a respective propulsor fan 110, 111, each of propulsors 106,107 may include a pitch controller or nozzle controller (neither of which is shown) for varying the pitch or nozzle area of the respective propulsor fan 110, 111. For example, propulsor 106A may receive a signal or message from controller 112 that causes propulsor 106A to alter the pitch angle of propulsor fan 110A. In response to the signal, the pitch controller of propulsor 106A may change the pitch of propulsor fan 110A accordingly which may increase or decrease the speed of fan 110A.

Each of the plurality of propulsor motors 108 and 109 represents any type of motor for receiving electrical power provided by an electric propulsion system and converting the electrical power to mechanical motion. Propulsor motors 108 and 109 are shown in FIG. 1 as being propulsion motors for an aircraft, for example, for driving propulsor fans 110 and 111. In some examples, propulsor motors 108 and 109 may include additional sensors and/or feedback circuitry for providing information (e.g., voltage, current, rotational speed, frequency, phase, etc.) back to the components of system 100 that are used to control motors 108 and 109, such as controller 112.

DC drive circuit 115 is a second subsystem of system 100 that is configured to deliver a portion of the electrical current provided by AC generator 102 to propulsors 107. DC drive circuit 115 is primarily shown as being a DC distribution system however in some examples, DC drive circuit may be a variable speed drive that receives variable frequency AC (e.g., via a DC link).

DC drive circuit 115 includes rectifier 122. Rectifier 122 of the DC drive circuit 115 is configured to provide DC electrical power, based on the AC electrical power from AC generator 102, to inverters 124. Rectifier 122 may comprise any suitable combination of electronics and circuitry that produces DC electrical power that is reflective of the characteristics of the AC electrical power being delivered by AC generator 102. The DC electrical power produced by rectifier 122 may provide an indication to control unit 112 and/or inverter 124 as to the frequency, phase, voltage, and/or current associated with a synchronizing signal that AC Drive Circuit 114 needs to produce in order to drive one of motors 106 back in-synch with AC generator 102.

In some examples, DC drive circuit 115 includes energy source 120. Energy source 120 may include one or more batteries or other types of energy storage units that are configured to provide additional DC electrical current to propulsors 107 that supplements the electrical current derived by DC drive circuit 115 from AC generator 102. The energy provided by energy source 120 may be used by system 100 for stabilizing the DC electrical power that passes between rectifier 122 and inverters 124 (e.g., for temporary source loss ride through). For example, during potential loss conditions associated with AC electrical power being delivered by AC generator 102, energy source 120 may provide synchronizing power that prevents the loss conditions from introducing anomalies in the power being delivered to propulsors 107. Energy source 120 may also provide some level of redundancy for recovery from other turbo generator or distribution system failures.

Controller 112 is configured to control how and when system 100 distributes, and refrains from distributing electrical current from AC generator 102 to propulsors 106 and 107. Controller 112 is shown as, generally, being operatively coupled to all of the components of system 100, including AC drive circuit 114 and DC drive circuit 115. Although not specifically shown in FIG. 1, controller 112 may also be operatively coupled to each of the individual components of AC drive circuit 114 and DC drive circuit 115. In other words, controller 112 may provide and/or receive signals and information, to and/or from each of the different components 102, 106, 107, 108, 109, 110, 111, 114, 115, 120, 122, 124, and any other components required to cause system 100 to distribute, and refrain from distributing, electrical current from AC generator 102 to propulsors 106 and 107. For example, controller 112 may communicate with other control modules, such as a control module associated with AC generator 102 to coordinate rotational speeds and potential load dynamics with AC generator 102 during synchronization. Although controller 112 is generally described as being the primary unit for controlling each of the components of system 100 for performing the techniques described herein, in some examples, the individual components of drive circuits 114 and 115 may include additional functionality for performing some or all of the operations described below with respect to controller 112.

Controller 112 may comprise any suitable arrangement of hardware, software, firmware, or any combination thereof, to perform the techniques attributed to controller 112 herein. Examples of controller 12 include any one or more microprocessors, digital signal processors (DSPs), application specific integrated circuits (ASICs), field programmable gate arrays (FPGAs), or any other equivalent integrated or discrete logic circuitry, as well as any combinations of such components. When controller 112 includes software or firmware, controller 112 further includes any necessary hardware for storing and executing the software or firmware, such as one or more processors or processing units.

In general, a processing unit may include one or more microprocessors, DSPs, ASICs, FPGAs, or any other equivalent integrated or discrete logic circuitry, as well as any combinations of such components. Although not shown in FIG. 1, controller 112 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 112 (e.g., may be external to a package in which controller 112 is housed).

Controller 112 may control the power distribution via AC drive circuit 114 to propulsors 106 to provide bulk or primary thrust to system 100 and may control the power distribution via DC drive circuit 115 to propulsors 107 to satisfy flight control or secondary thrust needs of system 100. Controller 112 may control the speed of each of propulsors 106 by controlling the rotational speed (e.g., shaft speed) of AC generator 102 and in some examples, by also controlling a pitch angle and/or nozzle areas of propulsors 106. Controller 112 may control the speed of each of propulsors 107 by individually controlling the motor speed of motors 109 and in some examples, by also controlling a pitch angle and/or nozzle areas of propulsors 107.

In accordance with techniques of this disclosure, controller 112 of system 100 may control AC drive circuit 114 and DC drive circuit 115 to distribute power from AC generator 102 to cause propulsors 106 and 107 to simultaneously produce bulk and flight-control thrust. That is, rather than relying on either AC drive circuit 114 alone or DC drive circuit 115 alone, controller 112 controls both AC and DC drive circuits 114 and 115 simultaneously to power propulsors 106 and 107 of system 100.

For example, controller 112 may perform modulation of the bulk thrust production from propulsors 106 by controlling the shaft speed of the engine that is driving AC generator 102 and supplying power to AC drive circuit 114. In addition, controller 112 may modulate the flight-control thrust production from propulsors 107 by individually controlling the motor speed of the one or more motors 109 of DC propulsors 107. In some examples, controller 112 may use variable pitch control of a subset of propulsors 106 and/or 107 for additional bulk or flight-control thrust modulation.

By relying on a combination of AC and DC drive circuits 114 and 115, system 100 may weigh less and operate with fewer losses to provide bulk thrust production from propulsors 106 than other propulsion systems that rely only on DC power distribution for propulsor thrust production. In addition, system 100 may provide finer control of its flight-control thrust production from propulsors 107 than other propulsion systems that rely only on AC power distribution for thrust production since system 100 can control propulsors 107 using variable motor speed control. As such, an aircraft that relies on system 100 may operate more efficiently, cost less, and have a greater operating range than other aircraft that rely on a traditional AC-only or DC-only power distribution system.

Figure 2:
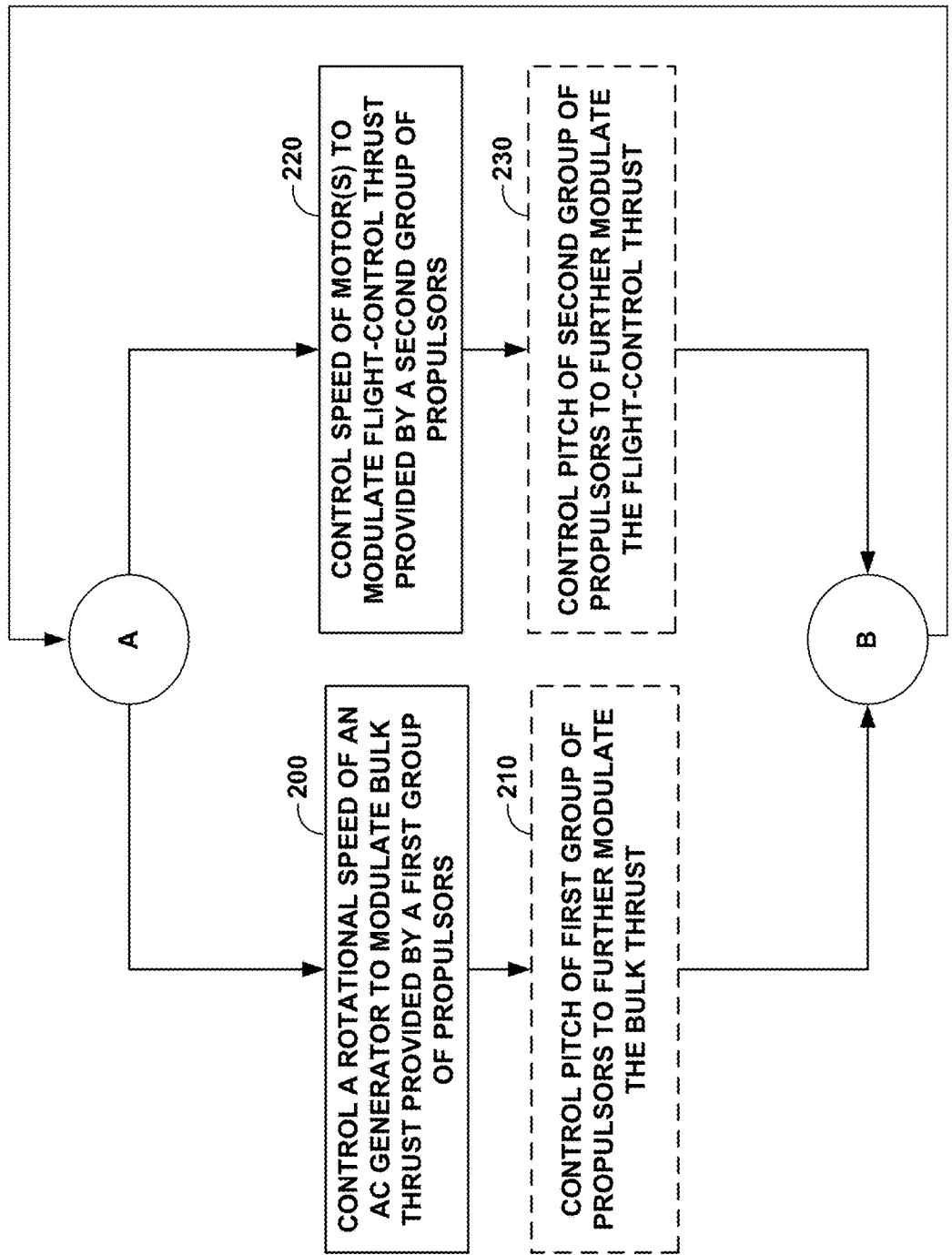
FIG. 2 is a flow chart illustrating example operations performed by an example controller configured to modulate thrust provided two groups of propulsors, in accordance with one or more aspects of the present disclosure.

FIG. 2 is a flow chart illustrating example operations performed by an example controller configured to modulate thrust provided two groups of propulsors, in accordance with one or more aspects of the present disclosure. FIG. 2 is described in the context of controller 112 of system 100 of FIG. 1.

Controller 112 may perform operations 200-230 to control power distribution from AC generator 102 to modulate bulk and flight-control thrust from propulsors 106 and 107. Controller 112 may repeat operations 200-230 and/or perform operations 200-230 in any order.

In operation, controller 112 may modulate a first amount of thrust provided by a first group of propulsors from a plurality of propulsors of the propulsion system by controlling a rotational speed of an AC generator of the propulsion system (200). For example, an aircraft that relies on system 100 may use propulsors 106 for producing "bulk" or primary thrust to cause the aircraft to have forward momentum. Since propulsors 106 are coupled to AC drive circuit 114, motors 108 and fans 110 of propulsors 106 may rotate at a speed that is the same or proportional to the rotational frequency or speed associated with AC generator 102 (e.g., the frequency or speed associated with the engine that is driving AC generator 102). Controller 112 may control the speed of propulsors 106 to vary the amount of bulk thrust being produced at any given moment by controlling the rotational speed associated with AC generator 102 (e.g., the speed of the engine that is driving AC generator 102). Controller 112 may increase the speed of the engine that is driving AC generator 102 to increase the speed of propulsors 106 or decrease the speed of the engine that is driving AC generator 102 to decrease the speed of propulsors 106.

Controller 112 may optionally further modulate the first amount of thrust provided by the first group of propulsors by controlling an amount of pitch associated with the first group of propulsors (210). For example, one or more of propulsors 106 may be variable pitch or variable nozzle area propulsors. The amount of thrust produced by a variable pitch or variable nozzle area propulsor may depend not only on speed of its rotation but also on the angle of pitch or the size of its nozzle opening. Controller 112 may individually control the variable pitch or nozzle area of any one of propulsors 106 to vary the amount of bulk thrust that is collectively being produced at any given moment by propulsors 106.

Controller 112 may modulate a second amount of thrust provided by a second group of propulsors from a plurality of propulsors of the propulsion system by controlling a motor speed of the second group of propulsors (220). For example, an aircraft that relies on system 100 may use propulsors 107 for producing "flight-control" or secondary thrust to cause the aircraft to change orientation or direction. Since propulsors 107 are coupled to DC drive circuit 115, motors 109 and fans 111 of propulsors 107 can be caused to spin at a rotational frequency or speed that is independent of the speed or rotational frequency of AC generator 102 and independent of the other propulsors 107. Therefore, controller 112 may independently increase or decrease the speed of one or more of propulsors 107 to change the amount of flight-control or secondary thrust needed for flight controls at any given time.

For instance, to modulate the second amount of thrust provided by the second group of propulsors controller 112 may control a respective motor speed of at least one first propulsor of the second group of propulsors 107 independent from controlling a respective motor speed of at least one second propulsor of the second group of propulsors 107. In other words, controller 112 may independently control the motor speed of motor 109A and independently control the motor speed of motor 109N to cause fans 111A and 111N to rotate at different rotational speeds. For example, controller 112 may send a first control signal to motor 109A that causes motor 109A to spin at a first speed (regardless as to the speed of any other motors 109 and 108). Controller 112 may send a second control signal to motor 109N that causes motor 109N to spin at a second speed (regardless as to the speed of any other motors 109 and 108) that may or may not be different than the first speed. In this way, controller 112 may cause fan 111A to spin at the first speed while simultaneously causing fan 111N to spin at the second speed.

Controller 112 may optionally further modulate the second amount of thrust provided by the second group of propulsors by controlling an amount of pitch associated with the second group of propulsors (230). For example, one or more of propulsors 107 may be variable pitch or variable nozzle area propulsors. Controller 112 may individually control the variable pitch or nozzle area of any one of propulsors 107 to vary the amount of flight-control thrust that is being produced at any given moment by that propulsor 107.

Figure 6A:
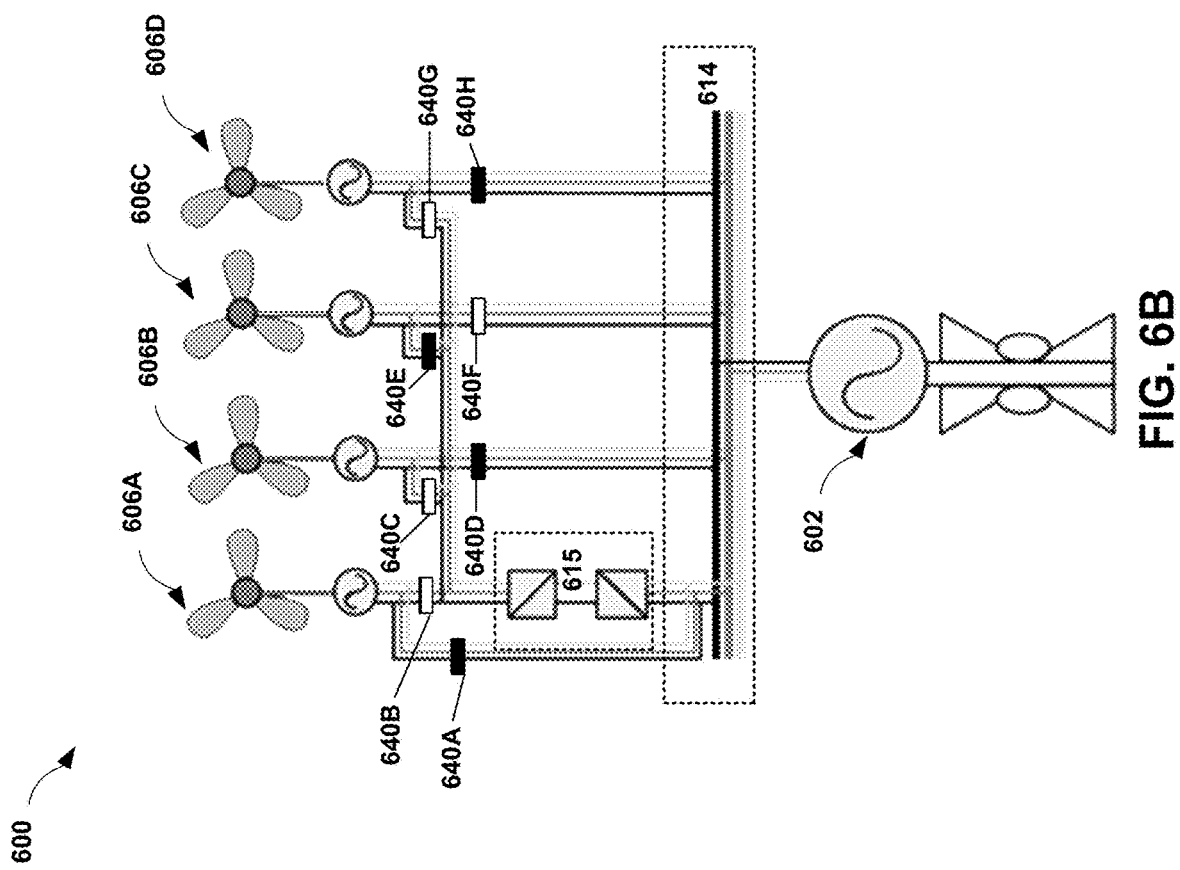
FIGS. 6A and 6B are conceptual diagrams illustrating an example electric propulsion system that uses both AC power distribution and a DC link for synchronizing a propulsor with a generator, in accordance with one or more aspects of the present disclosure.
Figure 6B:
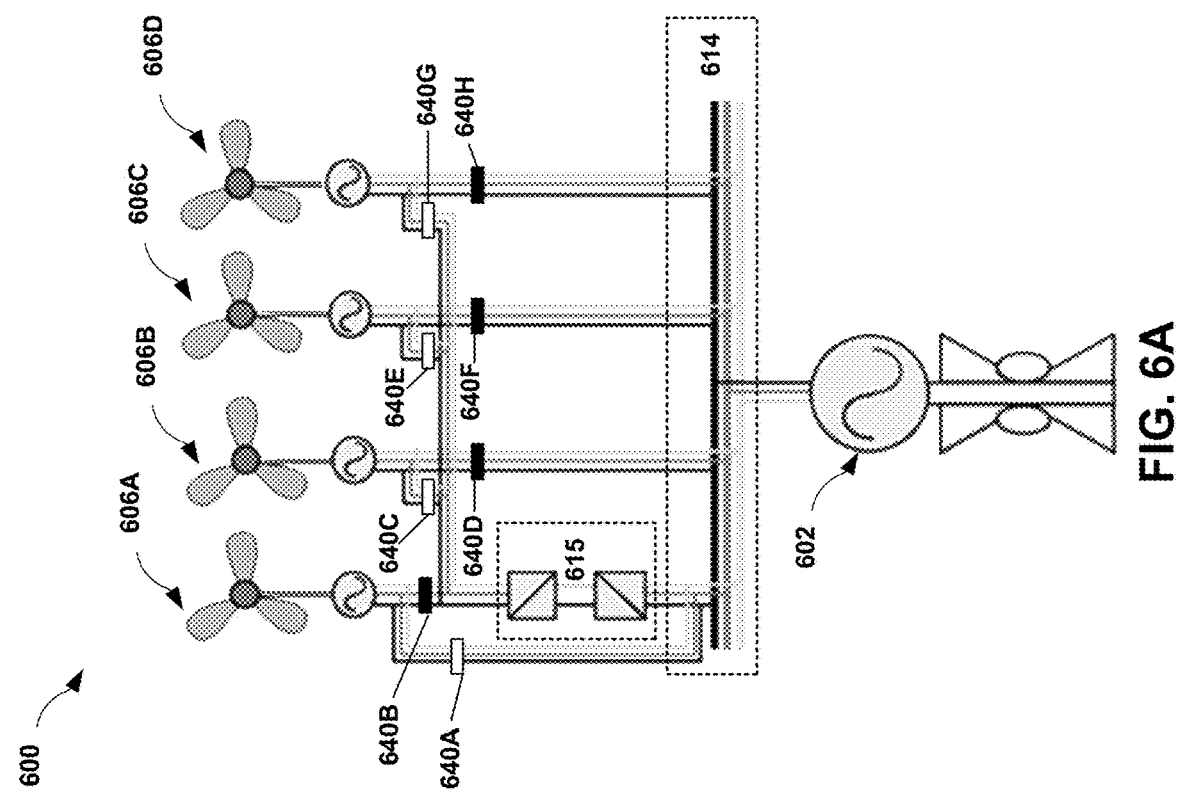

In some examples, as is described with respect to FIGS. 6A and 6B, controller 112 may cause system 100 to work with start-up and recovery synchronization. That is, the second group of propulsors may include a single propulsor from the plurality of propulsors and controller 112 may modulate the second amount of thrust provided by the second group of propulsors in response to determining that the single propulsor is not synchronized with the AC generator. In other words, controller 112 may rely on DC drive circuit 115 to re-synchronize an out-of-synchronized one of propulsors 106 or 107. For example, propulsor 106A may be configured to receive electrical power via AC drive circuit 114 or DC drive circuit 115 (but not both simultaneously). If while being driven by AC drive circuit 114, propulsor 106A falls out of synch with generator 102, controller 112 may decouple propulsor 106A from AC drive circuit 114 and couple propulsor 106A to DC drive circuit 115 to bring propulsor 106A back in-synch with generator 102.

By driving propulsor 106A with DC drive circuit 115, controller 112 may bring propulsor 106A back in-synch with generator 102 and then decouple propulsor 106A from DC drive circuit 115 and recouple propulsor 106A to AC drive circuit 114. In other words, responsive to determining that the single propulsor is synchronized with the AC generator, controller 112 may refrain from modulating the second amount of thrust by controlling the motor speed of the second group of propulsors, and modulate the second amount of thrust provided by the second group of propulsors by controlling the rotational speed of the engine that is driving the AC generator.

Figure 3B:
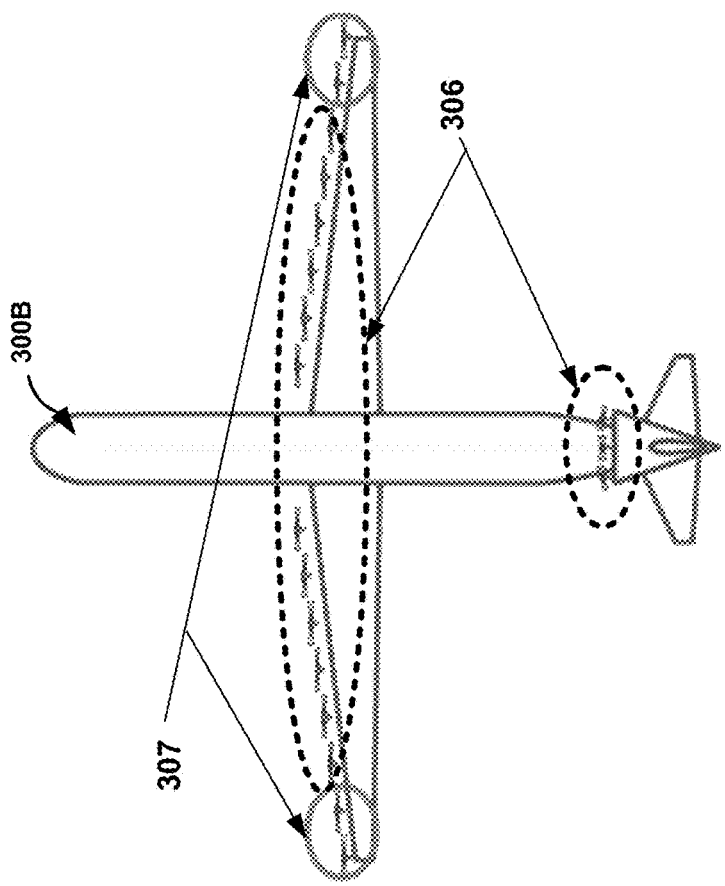
FIGS. 3A and 3B are conceptual diagrams illustrating example distributed propulsion air vehicles that rely on an example electric propulsion system that uses both AC power distribution and a second subsystem, in accordance with one or more aspects of the present disclosure.
Figure 3A:
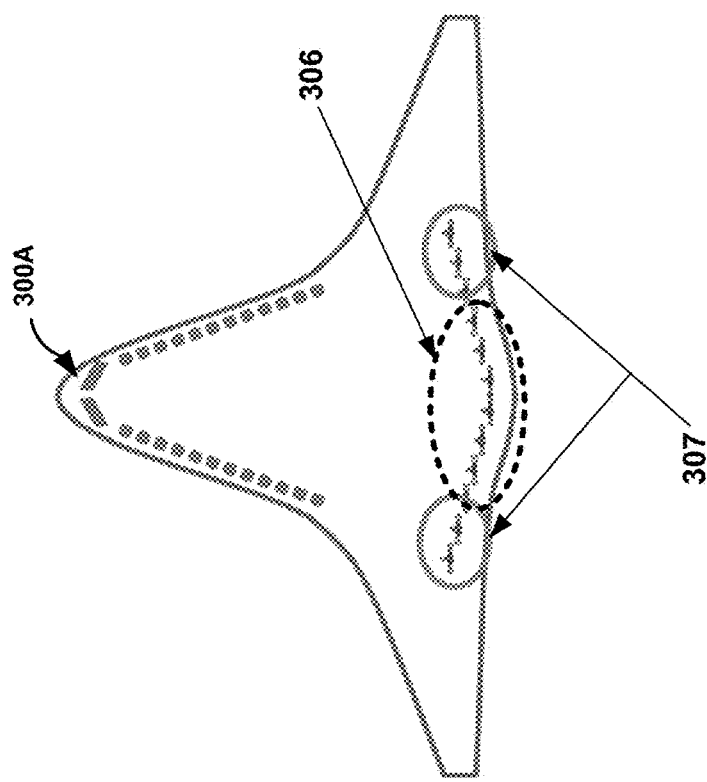

FIGS. 3A and 3B are conceptual diagrams illustrating example distributed propulsion air vehicles that rely on an example electric propulsion system that uses both AC power distribution and a second subsystem, in accordance with one or more aspects of the present disclosure. FIGS. 3A and 3B are described in the context of system 100 of FIG. 1. Air vehicles 300A and 300B of FIGS. 3A and 3B each include a first group of propulsors 306 and a second group of propulsors 307.

The example distributed propulsion air vehicles 300A and 300B shown in FIGS. 3A and 3B benefit by coupling the aerodynamic and propulsive functions of the vehicle and decoupling the propulsive and power generation functions typically accomplished by a gas turbine. In so doing, the mass and efficiency of air vehicles 300A and 300B is positively affected. In other distributed propulsion air vehicles, this coupling is accomplished via boundary layer ingestion or deflected slipstream. For example, air vehicle 300A is a blended wing body aircraft with boundary layer ingestion along the trailing edge of the center wing body.

When other air vehicles use a DC distribution system to drive propulsors, dedicated invertors for each propulsor may be used to manage the variable frequency AC signal that is used to drive the respective motor. Such a purely DC distribution system requires power electronics to first rectify and then invert the power.

The mass associated with large power electronics can be eliminated by relying on AC distribution systems and driving propulsors with variable frequency AC power directly from the generator. However, a purely AC distribution system introduces the need to initiate and maintain synchronous operation of the propulsor motors to the turbo generator that is driving the generator. For an air vehicle that relies purely on an AC distribution system, and also relies on fixed pitch propulsors, thrust modulation can only be provided by increasing and decreasing the power shaft speed on the engine or by disconnecting propulsors.

Thrust modulation is valuable for flight controls purposes. Thrust modulation can be achieved by adding a variable speed drive to a propulsor, or by adding a variable pitch mechanism to a propeller.

Air vehicles 300A and 300B take advantage of the benefits of both AC and DC distribution for distributed propulsion by using both power distribution techniques. For air vehicles 300A and 300B, not all propulsors 306 and 307 are tasked with flight-control of the air vehicle. In fact, the majority of the propulsors 306 and 307 are intended for bulk thrust modulation. For example, air vehicles 300A and 300B may include a greater quantity of propulsors 306 that are used for bulk or primary thrust modulation than the quantity of propulsors 307 which are being used for flight-control thrust modulation.

Since air vehicles 300A and 300B only need to independently control the fan speed of propulsors 307 for flight-control thrust modulation, propulsors 307 may be placed on the DC distribution system while propulsors 306 that do not require independent control may be placed on the AC distribution system. The speed of propulsors 307 may be set by a variable speed drive. As such, variable speed propulsors 307 may be used for air vehicle flight-control trimming and/or stability augmentation. Air vehicles 300A and 300B may further augment the flight-control trimming and/or stability augmentation provided by propulsors 307 via variable pitch control or a variable area nozzle adjustment. In some examples, energy storage on the DC distribution system may be used to provide stability to the DC distribution system and/or to provide temporary or long term thrust support.

As shown in FIGS. 3A and 3B, air vehicles 300A and 300B may position propulsors 307 that are being fed by the DC distribution system at a greater distance from the aircraft centerline of air vehicles 300A and 300B than propulsors 306. Positioning propulsors 307 at a greater distance from the aircraft centerline of air vehicles 300A and 300B than propulsors 306 may provide the largest moment arm for yaw control purposes.

Propulsors 306 that are positioned near the center body of the aircraft have limited ability to provide directional control via differential thrust and may therefore primarily used for bulk thrust modulation. The speed of propulsors 306 that are powered by the variable frequency AC distribution system may be fixed in relation to the speed of the engine that is driving (e.g., prime mover) the AC generator by a ratio of the motor and generator pole counts. Bulk thrust modulation may be achieved by varying the speed of the engine and thereby varying the speed of the engine that is driving the AC generator. In addition, similar to propulsors 307, propulsors 306 may also provide thrust augmentation via variable pitch control or a variable area nozzle control.

By assigning propulsors in this manner, the amount of power electronics equipment required by air vehicles 300A and 300B may be reduced as compared to other air vehicles, which eliminates weight and losses from the system. In addition, assigning propulsors in this way may also provide flight control via fan speed thrust modulation for a limited subset of propulsors.

Figure 4:
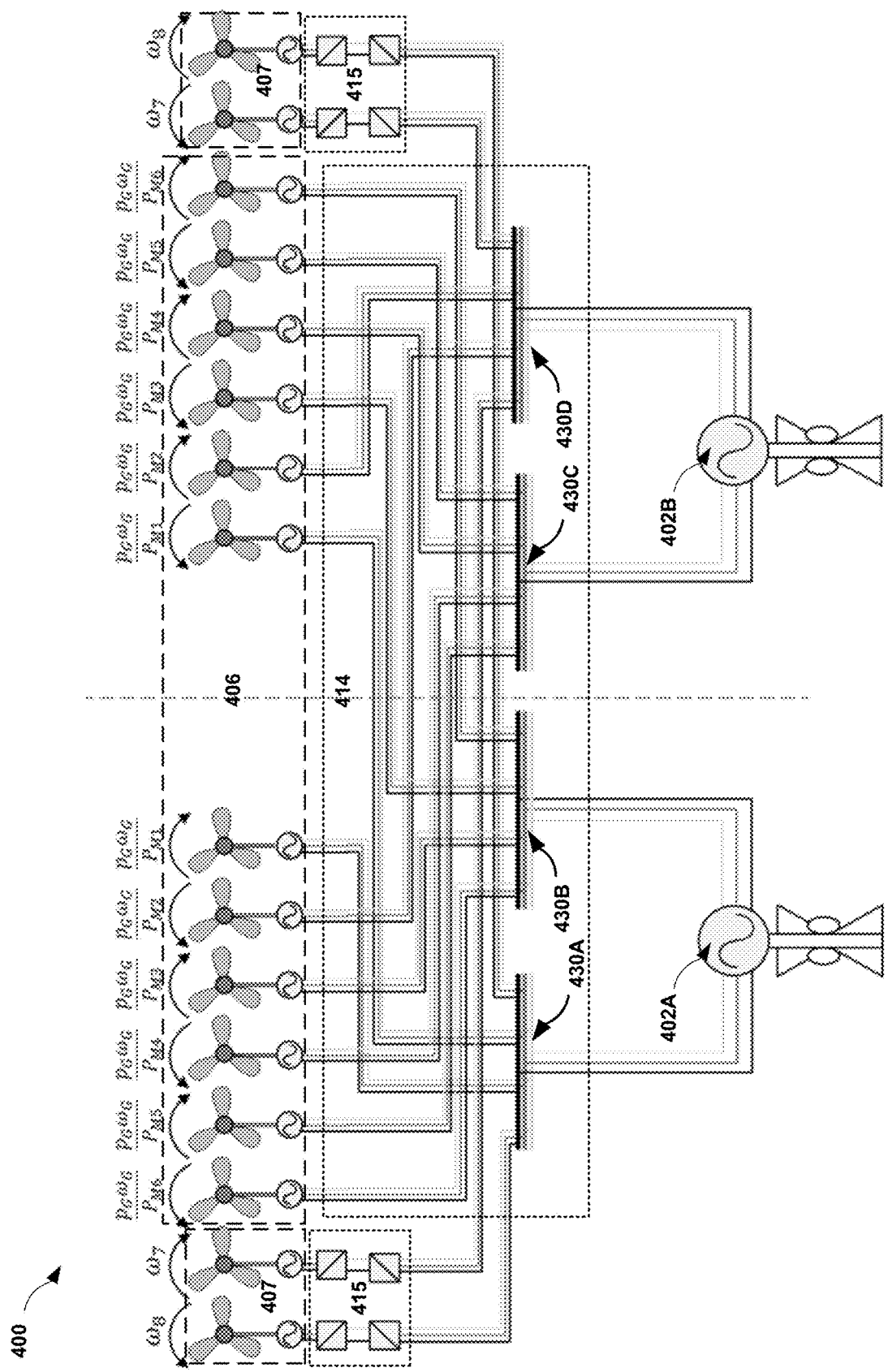
FIGS. 4 and 5 are conceptual diagrams illustrating additional example electric propulsion systems that use both AC power distribution and one or more DC links, in accordance with one or more aspects of the present disclosure.
Figure 5:
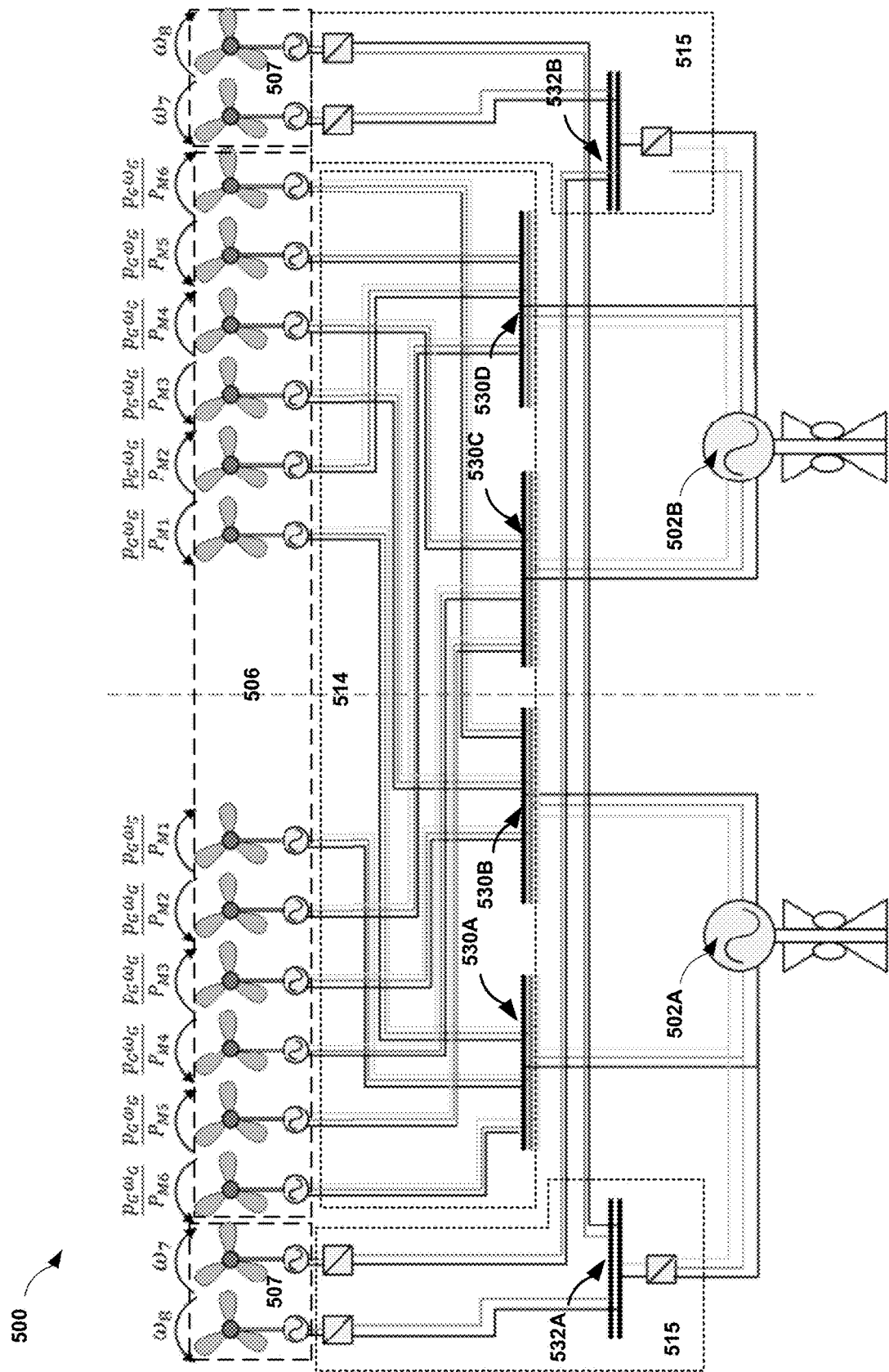

FIGS. 4 and 5 are conceptual diagrams illustrating additional example electric propulsion systems that use both AC power distribution and one or more DC links, in accordance with one or more aspects of the present disclosure. FIGS. 4 and 5 are described in the context of system 100 of FIG. 1.

Electric propulsion system 400 of FIG. 4 receives electrical power from two generators 402A and 402B that are each driven by a different respective engine. System 400 includes AC drive circuit 414 that is configured to deliver electrical current to a first group of propulsors 406. AC drive circuit 414 includes four AC propulsion buses 430A-430B. Propulsors 406 include twelve propulsors that are configured to provide bulk thrust to system 400. System 400 also includes DC link circuit 415 that is configured to deliver electrical current to a second group of propulsors 407. Propulsors 407 include four propulsors that are driven by variable speed drives and positioned further from the aircraft centerline of the air vehicle that includes system 400. Propulsors 407 are configured to provide flight-control thrust to system 400. The speeds of propulsors 406 are determined by the pole count ratio between generators 402A and the individual motors of propulsors 406 and the generators 402 speeds. The speeds of propulsors 407 are each determined independently by their respective variable speed drive.

Electric propulsion system 500 of FIG. 5, also receives electrical power from two generators 502A and 502B that are each driven by a different respective engine. System 500 includes AC drive circuit 514 that is configured to deliver electrical current to a first group of propulsors 506. Propulsors 506 include twelve propulsors that are configured to provide bulk thrust to system 500. System 500 also includes DC drive circuit 515 that is configured to deliver electrical current to a second group of propulsors 507. Propulsors 507 include four propulsors that are driven by variable speed drives and positioned further from the aircraft centerline of the air vehicle that includes system 500. Propulsors 507 are configured to provide flight-control thrust to system 500. The speeds of propulsors 506 are determined by the pole count ratio between generators 502A and the individual motors of propulsors 506. The speeds of propulsors 507 are each determined independently by their respective variable speed drive.

In contrast to system 400, AC drive circuit 514 receives electrical power from four AC propulsion buses 530A-530B and DC drive circuit 515 receives electrical power from two DC propulsion buses 532A and 532B. FIGS. 4 and 5 illustrate only two example configurations of a combined DC and AC electrical propulsion system in accordance with techniques of this disclosure. Other quantities of propulsors, and DC and AC buses are also possible.

FIGS. 6A and 6B are conceptual diagrams illustrating an example electric propulsion system that uses both AC power distribution and a DC link for synchronizing a propulsor with a generator, in accordance with one or more aspects of the present disclosure. System 600 is described below in the context of system 100 of FIG. 1.

System 600 includes generator 602, propulsors 606A-606D, AC drive circuit 614 which is configured as a variable frequency, variable voltage bus, DC link circuit 615 which is configured as a variable speed drive circuit, and isolation devices 640A-640H (collectively "isolation devices 640"). System 600 is an example configuration of an example electric propulsion system that is configured to work with start-up and recovery synchronization techniques using a cross feed from a variable speed drive to any of propulsors 606.

Isolation devices 640 represent isolation devices that are selectively controllable (e.g., by controller 112) for isolating the various components of system 600 from AC drive circuit 614 and DC link circuit 615. That is, isolation devices 640 are configurable for blocking voltages, interrupting currents and isolating conductors (e.g., physical or solid state interrupters) at the various components of system 600 that receive power from drive circuit 614 and DC link circuit 615. The shading of isolation devices 640 in FIGS. 6A and 6B indicates whether that isolation device 640 is opened or closed. That is, dark indicates that an isolation device 640 is closed, and white indicates that an isolation device 640 is open. When closed that isolation device 640 transmits current, whereas when that isolation device 640 is open it does not transmit current.

During nominal operation, the variable speed drive provided by DC link circuit 415 only powers one of propulsors 606, and the other remaining propulsors 606 are powered by the variable frequency, variable voltage bus of AC drive circuit 414. For example, FIG. 6A shows propulsor 606A receiving electrical current from DC link circuit 615 while each of propulsors 606B-606D receives electrical current from AC drive circuit 614.

However, during startup or if one of the propulsors 606 comes un-synced, the variable speed drive of DC drive circuit 614 can be connected to the un-synced propulsor 606 to bring it back into synchronization before returning to nominal operation. For example, FIG. 6B shows propulsor 606A temporarily being placed on AC drive circuit 614 and receiving electrical current from AC drive circuit 614 along with each of propulsors 606B and 606D while propulsor 606C is temporarily placed on DC link circuit 615 and receiving electrical current from DC link circuit 615 to become back in synch with generator 602. Such an operation may have to be coordinated with the flight control system to make sure that the moment provided by the DC driven propulsor motor 606 (e.g., 606A in this example) which is temporarily placed on the AC drive circuit 614 during sync recovery. Additionally, if the DC link driven propulsor (e.g., 606A in this example) is not tasked with flight control during certain portions of the mission, this propulsor may be driven synchronized by the AC drive circuit 614.

In this way, some of propulsors 606 may be configured to receive power from a DC link circuit 615 or from an AC drive circuit 614 depending on the state of system 600 and the operating conditions of system 600. Nominally, propulsors 606 may receive power via AC drive circuit 614 to avoid the losses associated with DC link circuit 615. However, if in the condition where a propulsor 606 which is providing flight control capability fails, the remaining propulsors 606 may switch over to receiving power from DC link circuit 615. In this scenario these alternate DC driven propulsors supply flight control capability. The foregoing techniques may be used in combination with a variety of way for managing AC synchronization, protection strategies, propulsor control techniques (e.g. in combination variable pitch, variable areas), and propulsor configurations (direction of rotation, position on aircraft, propulsor/motor size).

Clause 1. A propulsion system comprising: an AC generator configured to produce electrical current; a plurality of propulsors configured to receive the electrical current from the AC generator and provide thrust based on the electrical current from the AC generator; an AC distribution system configured to deliver a first portion of the electrical current to a first group of propulsors from the plurality of propulsors; and a second subsystem configured to deliver a second portion of the electrical current to a second group of propulsors from the plurality of propulsors.

Clause 2. The propulsion system of clause 1, wherein the second subsystem comprises at least one of: a DC distribution system; or a variable speed drive with a DC link.

Clause 3. The propulsion system of any one of clauses 1-2, further comprising a controller configured to: modulate a first amount of thrust provided by the first group of propulsors by controlling a rotational speed associated with the AC generator; and modulate a second amount of thrust provided by the second group of propulsors by controlling a motor speed of the second group of propulsors.

Clause 4. The propulsion system of clause 3, wherein the controller is further configured to at least one of: modulate the first amount of thrust provided by the first group of propulsors by controlling an amount of pitch associated with the first group of propulsors; or modulate the second amount of thrust provided by the second group of propulsors by controlling an amount of pitch associated with the second group of propulsors.

Clause 5. The propulsion system of any one of clauses 3-4, wherein the controller is further configured to modulate the second amount of thrust provided by the second group of propulsors by controlling a respective motor speed of at least one first propulsor of the second group of propulsors independent from controlling a respective motor speed of at least one second propulsor of the second group of propulsors.

Clause 6. The propulsion system of any one of clauses 1-5, wherein the first group of propulsors are configured to provide bulk thrust to the propulsion system, and the second group of propulsors are configured to provide flight control thrust to the propulsion system.

Clause 7. The propulsion system of any one of clauses 1-6, wherein the first group of propulsors comprises a greater quantity of propulsors than the second group of propulsors.

Clause 8. The propulsion system of any one of clauses 1-7, wherein the AC generator is a first AC generator, the propulsion system further comprising at least one second AC generator, wherein the first AC generator and the at least one second AC generator are configured to jointly produce the electrical current received by the plurality of propulsors.

Clause 9. The propulsion system of any one of clauses 1-8, wherein the AC distribution system comprises one or more AC buses.

Clause 10. The propulsion system of clause 9, wherein the first group of propulsors are distributed amongst the two or more AC buses.

Clause 11. The propulsion system of any one of clauses 1-10, wherein the second subsystem comprises a DC distribution system that includes one or more DC buses.

Clause 12. The propulsion system of clause 11, wherein the second group of propulsors are distributed amongst the two or more DC buses.

Clause 13. The propulsion system of any one of clauses 1-12, wherein the second group of propulsors comprises a single propulsor from the plurality of propulsors that has fallen out of synchronization with the AC generator.

Clause 14. The propulsion system of clause 13, wherein: the second subsystem is further configured to refrain from delivering the second portion of the electrical current to the single propulsor when the single propulsor is synchronized with the AC generator; and the AC distribution system is further configured to deliver the second portion of the electrical current to the single propulsor when the single propulsor is synchronized with the AC generator.

Clause 15. A method comprising: modulating, by a controller of a propulsion system, a first amount of thrust provided by a first group of propulsors from a plurality of propulsors of the propulsion system by controlling a rotational speed associated with an AC generator of the propulsion system; and modulating, by the controller, a second amount of thrust provided by a second group of propulsors from a plurality of propulsors of the propulsion system by controlling a motor speed of the second group of propulsors.

Clause 16. The method of clause 15, further comprising at least one of:

modulating the first amount of thrust provided by the first group of propulsors by controlling an amount of pitch associated with the first group of propulsors; or modulating the second amount of thrust provided by the second group of propulsors by controlling an amount of pitch associated with the second group of propulsors.

Clause 17. The method of any one of clauses 15-16, wherein modulating the second amount of thrust provided by the second group of propulsors comprises controlling a respective motor speed of at least one first propulsor of the second group of propulsors independent from controlling a respective motor speed of at least one second propulsor of the second group of propulsors.

Clause 18. The method of any one of clauses 15-17, wherein:

the second group of propulsors comprises a single propulsor from the plurality of propulsors; and modulating the second amount of thrust provided by the second group of propulsors is in response to determining that the single propulsor is not synchronized with the AC generator.

Clause 19. The method of clause 18, further comprising: responsive to determining that the single propulsor is synchronized with the AC generator: refraining from modulating the second amount of thrust by controlling the motor speed of the second group of propulsors; and modulating the second amount of thrust provided by the second group of propulsors by controlling the rotational speed of the AC generator.

Clause 20. A system comprising: means for delivering a first portion of an AC current to a first group of propulsors from the plurality of propulsors; means for delivering a second portion of the AC current to a second group of propulsors from the plurality of propulsors; means for modulating a first amount of thrust provided by the first group of propulsors by controlling a rotational speed of an AC generator of the propulsion system; and means for modulating a second amount of thrust provided by the second group of propulsors by controlling a motor speed of the second group of propulsors.

Clause 21. A computer readable storage medium comprising instructions that when executed cause at least one processor to perform any one of the methods of clauses 15-19.

Clause 22. A system comprising means for performing any one of the methods of clauses 15-19.

Various examples have been described. These and other examples are within the scope of the following claims.

What is claimed is:

1. A propulsion system comprising:
an alternating current (AC) generator configured to produce electrical current;
a plurality of propulsors configured to receive the electrical current from the AC generator and provide thrust based on the electrical current from the AC generator;
an AC drive circuit configured to deliver a first portion of the electrical current to a first group of propulsors from the plurality of propulsors;
a direct current (DC) circuit configured to simultaneously deliver a second portion of the electrical current to a second group of propulsors from the plurality of propulsors, different from the first group of propulsors; and
a controller configured to:
modulate a first amount of thrust provided by the first group of propulsors by controlling a rotational speed associated with the AC generator; and
modulate a second amount of thrust provided by the second group of propulsors by controlling a motor speed of the second group of propulsors.

2. The propulsion system of claim 1, wherein the DC circuit comprises at least one of:
a DC drive circuit; or
a DC link circuit coupled to a variable speed drive of the second group of propulsors.

3. The propulsion system of claim 1, wherein the controller is further configured to at least one of:
modulate the first amount of thrust provided by the first group of propulsors by controlling an amount of pitch associated with the first group of propulsors; or
modulate the second amount of thrust provided by the second group of propulsors by controlling an amount of pitch associated with the second group of propulsors.

4. The propulsion system of claim 1, wherein the controller is further configured to modulate the second amount of thrust provided by the second group of propulsors by controlling a respective motor speed of at least one first propulsor of the second group of propulsors independent from controlling a respective motor speed of at least one second propulsor of the second group of propulsors.

5. The propulsion system of claim 1, wherein the first group of propulsors are configured to provide bulk thrust to the propulsion system, and the second group of propulsors are configured to provide flight control thrust to the propulsion system.

6. The propulsion system of claim 1, wherein the first group of propulsors comprises a greater quantity of propulsors than the second group of propulsors.

7. The propulsion system of claim 1, wherein the AC generator is a first AC generator, the propulsion system further comprising at least one second AC generator, wherein the first AC generator and the at least one second AC generator are configured to jointly produce the electrical current received by the plurality of propulsors.

8. The propulsion system of claim 1, wherein the AC drive circuit comprises one or more AC buses.

9. The propulsion system of claim 8, wherein the first group of propulsors are distributed amongst the one or more AC buses.

10. The propulsion system of claim 1, wherein the DC circuit comprises a DC drive circuit that includes one or more DC buses.

11. The propulsion system of claim 10, wherein the second group of propulsors are distributed amongst the one or more DC buses.

12. The propulsion system of claim 1, wherein the second group of propulsors comprises a single propulsor from the plurality of propulsors that has fallen out of synchronization with the AC generator.

13. The propulsion system of claim 12, wherein:
the DC circuit is further configured to refrain from delivering the second portion of the electrical current to the single propulsor when the single propulsor is synchronized with the AC generator; and
the AC drive circuit is further configured to deliver the second portion of the electrical current to the single propulsor when the single propulsor is synchronized with the AC generator.

14. A method comprising:
modulating, by a controller of a propulsion system, a first amount of thrust provided by a first group of propulsors from a plurality of propulsors of the propulsion system by controlling a rotational speed associated with an AC generator of the propulsion system; and
simultaneously modulating, by the controller, a second amount of thrust provided by a second group of propulsors from the plurality of propulsors of the propulsion system, different from the first group of propulsors, by controlling a motor speed of the second group of propulsors.

15. The method of claim 14, further comprising at least one of:
modulating the first amount of thrust provided by the first group of propulsors by controlling an amount of pitch associated with the first group of propulsors; or
modulating the second amount of thrust provided by the second group of propulsors by controlling an amount of pitch associated with the second group of propulsors.

16. The method of claim 14, wherein modulating the second amount of thrust provided by the second group of propulsors comprises controlling a respective motor speed of at least one first propulsor of the second group of propulsors independent from controlling a respective motor speed of at least one second propulsor of the second group of propulsors.

17. The method of claim 14, wherein:
the second group of propulsors comprises a single propulsor from the plurality of propulsors; and
modulating the second amount of thrust provided by the second group of propulsors is in response to determining that the single propulsor is not synchronized with the AC generator.

18. The method of claim 17, further comprising:
responsive to determining that the single propulsor is synchronized with the AC generator:
refraining from modulating the second amount of thrust by controlling the motor speed of the second group of propulsors; and
modulating the second amount of thrust provided by the second group of propulsors by controlling the rotational speed of the AC generator.

19. A system comprising:
means for delivering a first portion of an AC current to a first group of propulsors from a plurality of propulsors;
means for delivering a second portion of the AC current to a second group of propulsors from the plurality of propulsors, different from the first group of propulsors;
means for modulating a first amount of thrust provided by the first group of propulsors by controlling a rotational speed of an AC generator of the propulsion system; and
means for simultaneously modulating a second amount of thrust provided by the second group of propulsors by controlling a motor speed of the second group of propulsors.

* * * * *